ELECTRONIC MEMORY WITHOUT COMPENSATED READ SIGNAL

Filed Aug. 28, 1961 2 Sheets-Sheet 1

INVENTORS
W. D. PRICER
H. P. WOLFF
BY Joseph C. Redmond Jr.
ATTORNEY

3,189,877
ELECTRONIC MEMORY WITHOUT COMPENSATED READ SIGNAL

Wilbur David Pricer, Wappingers Falls, and Hermann P. Wolff, Poughkeepsie, N.Y., assignors to International Business Machines Corporation, New York, N.Y., a corporation of New York Filed Aug. 28, 1961, Ser. No. 134,284
6 Claims. (Cl. 340—173)

This invention relates to electronic memories and more particularly to apparatus for and methods of operating electronic memories.

Present day information handling apparatus operates at high data input-output rates. Memories for such apparatus must provide clear and distinguishable signals indicative of the information stored in the memory, otherwise erroneous data will be introduced into the information being processed by the apparatus. Memories employing semiconductor devices as storage elements have been found to have the required speed of operation in such apparatus but are particularly troublesome in providing the necessary clear and distinguishable output signals. One reason for the poor output signals is due to the characteristics of the drivers, storage elements and sense amplifiers being such that a noise or disturb signal is developed simultaneously with the "true" information signal when read out of the memory occurs. The disturb signal is sufficiently large to be confused by the sense amplifier with the true output signals from the storage elements, thereby enabling erroneous data to be introduced into the information being processed by the apparatus. Feedback means to compensate for the disturb signal have been found to be inadequate. Other arrangements as disclosed in the publication "1960 International Solid-State Circuits Conference—Digest of Technical Papers," published by Louis Winner, New York 36, New York, First Edition, February 1960, page 52, improve the true signal-to-disturb ratio by costly and complex circuitry which is considered to be unsuitable from a practical standpoint for commercial information handling apparatus. It is desirable from a commercial standpoint, therefore, to improve the performance of memories employing semiconductor storage elements in order to provide clear and distinguishable output signals at the required speeds thereby preventing erroneous data from being entered into information being processed by information handling apparatus.

A general object of the present invention is an improved memory employing semiconductor devices having output signals without disturb signal effects during readout of the memory.

One object is a memory having driver means that do not require compensation in providing clear and distinguishable memory output signals.

Another object is an electronic memory having high speed operation without auxiliary apparatus for preventing or reducing disturb signal effects during readout.

Another object is a method of operating a semiconductor memory without the necessity of distinguishing between true and disturb signals.

Still another object is a "read zero" method of operating semiconductor memories.

These and other objects are accomplished in accordance with the present invention, one illustrative embodiment of which comprises an $m$ number of $x$ lines and an $n$ number of $y$ lines forming $mn$ crosspoints, $m$ and $n$ being any integer. Connected to each crosspoint is a storage element, typically a bistable semiconductor device adapted to have first and second storage conditions indicative of a binary "0" and a binary "1," the storage elements being biased from the same voltage source for the two stable conditions. A sense amplifier is connected to the storage element to detect changes in current level when a storage element on the line is switched from one stable condition to the other. Driver means are connected to the $x$ and $y$ lines for providing signals to switch the storage elements connected thereto from one stable condition to the other. The magnitude of the driver signals supplied to one set of lines is such that normally during readout a noise signal is developed by the driver. In the present invention, however, the operating points of the storage elements are altered so that a defined noise output signal is obtained for any storage element in one storage condition, but substantially no change in signal level is obtained from those storage elements in the other or second storage condition because the noise or disturb signal is substantially cancelled. As a result the memory provides clear and distinguishable output signals indicative of the storage conditions without any compensation requirements for disturb signals originated by the driver.

One feature of the memory is a readout pulse adjusting the current requirements of a bistable semiconductor device so that one stable operating condition is the same prior to and after a read-out pulse is applied to the device desired to be read out.

Another feature is employing a noise or disturb signal as one output signal from a bistable semiconductor memory element and suitably cancelling the disturb signal by a true signal so that the absence of the signal appears as the other signal from the memory element.

Still another feature is biasing each bistable semiconductor of a memory to have a load line which intersects its operating curve in first and second stable regions to form two stable operating points at first and second current levels, respectively, and thereafter applying a readout pulse to preselected memory elements desired to be read out whereby the load line is shifted to a position where it intersects the first stable region only, but at a current level equal to that of the second stable operating point.

The foregoing and other objects, features and advantages of the invention will be apparent from the following more particular description of a preferred embodiment of the invention, as illustrated in the accompanying drawings.

Figure 1:
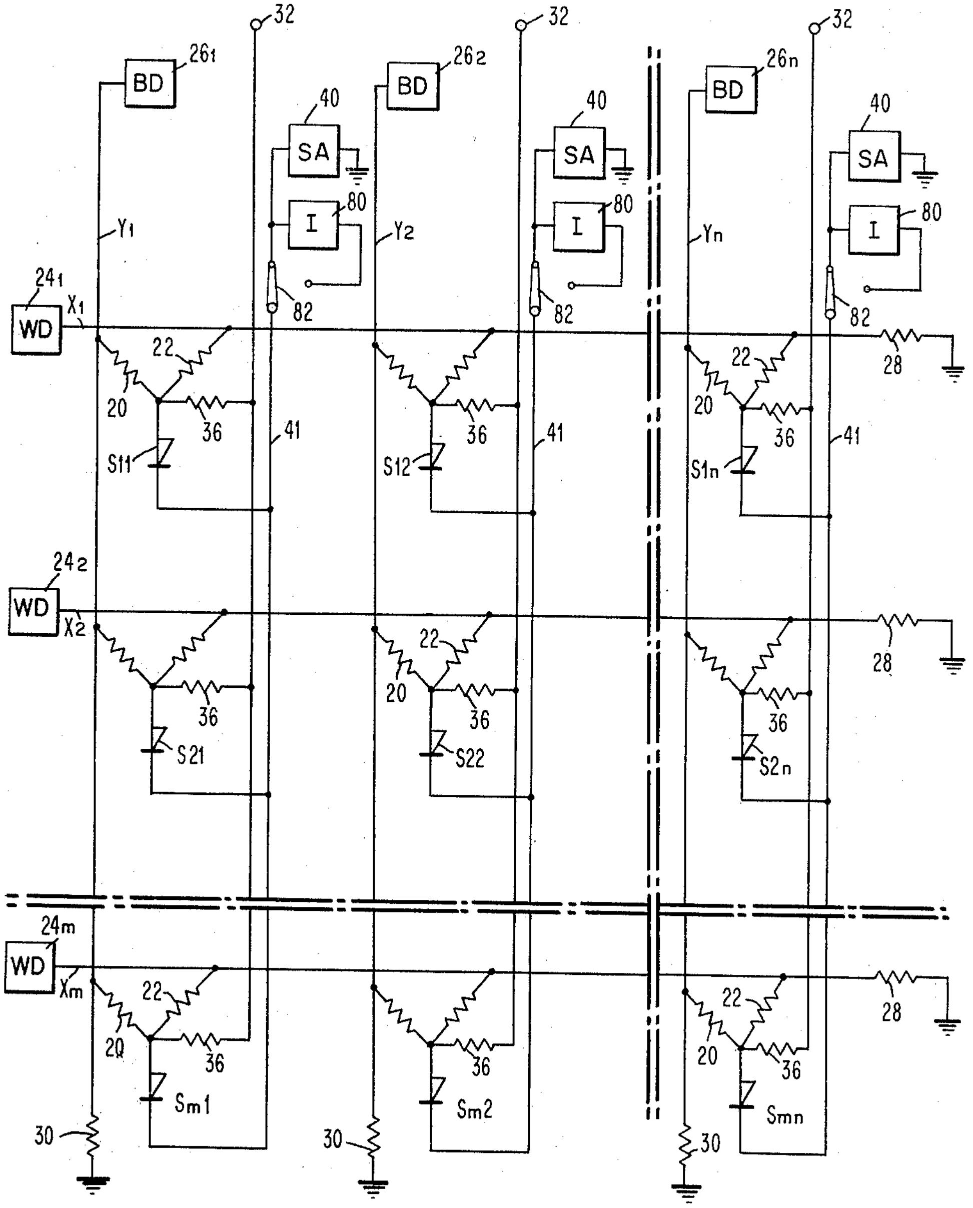
FIG. 1 is an electrical schematic of an electronic memory employing the principles of the present invention.

Referring to FIG. 1, an electronic memory comprises an $m$ number of $x$ lines and an $n$ number of $y$ lines which intersect to form an $mn$ number of crosspoints where $m$ and $n$ are any integer. Connected to each crosspoint is a storage element having a reference designation corresponding to those of the intersecting $x$ and $y$ lines. For example, the upper left storage element is designated S11 and the lower right storage element is designated S$mn$, since $x_1$ and $y_1$ lines and $x_m$ and $y_n$ lines, respectively, connect to the storage elements. Each $x$ and $y$ line is connected through resistors 22 and 20, respectively to the storage elements. The resistors isolate each storage element from the other storage elements sharing the same driver. Connected to the $x$ lines are word drivers 24, the reference characters thereof having a subscript indicative of the $x$ line with which it is associated. Connected to the $y$ lines are bit drivers 26, the reference characters thereof having a subscript designating the $y$ line with which it is associated. All the $x$ and $y$ drive lines are suitably terminated by resistor means 28 and 30. The word and bit drivers are of conventional construction and operation being described, for example, in the above-mentioned Digest of Technical Papers, page 40. Also connected to the storage elements are a voltage source 32, and individual current limiting resistors 36 connected to each storage element, the combination serving as a biasing means for the storage elements. A sense amplifier 40 is connected through lines 41 to each storage element to record any changes in current level as the storage elements change stable conditions. The sense amplifiers are of conventional construction and described, for example, in the above-mentioned Digest of Technical Papers, page 113. A network 80 is also adapted to be connected in the circuit by means of a switch 82 for reasons more apparent hereinafter.

Figure 2:
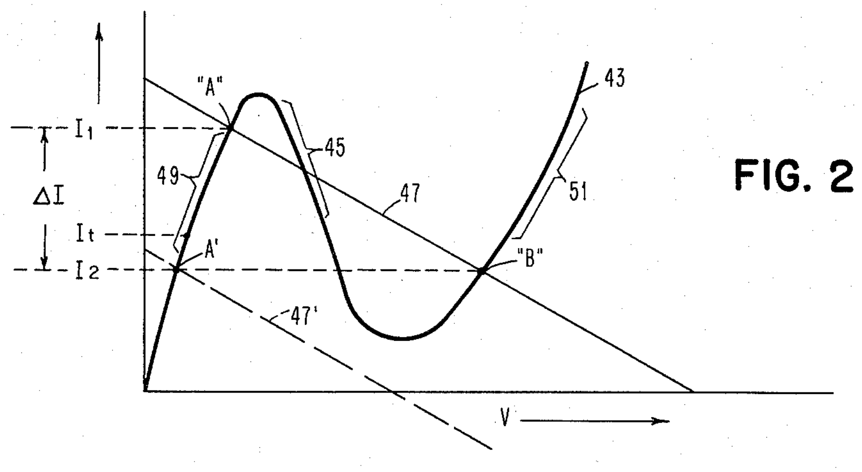
FIG. 2 is a current-voltage curve of a storage element employed in FIG. 1.

The storage elements employed in the present invention are semiconductor devices having two stable conditions. Such devices, commonly known as bistable devices, are known to exist in several forms to workers skilled in the art. One eminently satisfactory bistable device as described in an article entitled "New Phenomena In Narrow Germanium PN Junctions," Physical Review, volume 109, 1958, pages 603 to 604, by Leo Esaki. The device described in the previously mentioned publication is commonly referred to as a tunnel diode or Esaki diode. The tunnel diode as shown in FIG. 2 has a current voltage characteristic curve 43 which includes a negative resistance region 45 and positive resistance regions 49 and 51. When the diode is suitable loaded and biased, a load line 47 is developed which establishes information states or operating points A and B designated binary "0" and binary "1," respectively. The diode may be switched from the "0" state to the "1" state by a positive pulse supplied by the word and bit drivers which raises the load line above the peak of the curve 43. Similarly, the diode may be read out from the "1" state to the "0" state by the word driver supplying a negative pulse which lowers the load line below the valley and switches the diode from the B to the A operating point. In the event that the diode is in a "0" state when the readout pulse is applied, the operating point is lowered to a reduced current level at A' so long as the pulse is applied. Thereafter, the operating point returns to point A. The shuttling action of the diode between operating points A and A' alters the current level thereof resulting in a noise or disturb signal which will be described in more detail hereinafter.

The tunnel diode has been selected as a preferred bistable semiconductor element for the present invention because of the extreme speed of response thereof. Accordingly, the remaining paragraphs of the detailed description will be limited to a memory employing the tunnel diode as the storage element, but it should be understood that other bistable semiconductors may be employed in the present invention with satisfactory results.

Before describing the operation of the present invention it is believed in order to describe the noise or disturb limitations appearing in the prior art operation of the memory shown in FIG. 1. With that as a background, the improvement realized by the present invention will be more apparent, thereby aiding a further appreciation of the invention.

Figure 3A:
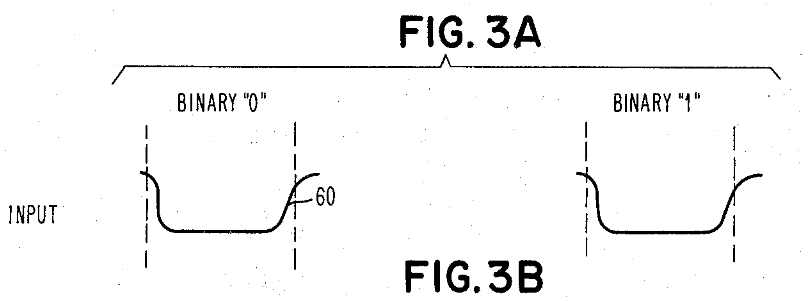
FIGS. 3A and 3B are input and output signals, respectively, to and from the memory of FIG. 1 operating in accordance with the techniques employed in the prior art.
Figure 3B:
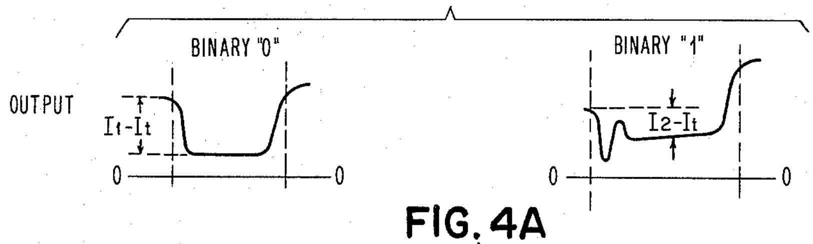

Prior art operation of the memory of FIG. 1 is accomplished by a selected word driver (for example, driver 24) applying a negative or readout current pulse 60, as shown in FIG. 3A, to the storage elements connected thereto. Assuming these storage elements are in different operating states, their operating points will be shuttled in accordance with the magnitude of the readout current $I_t$ as indicated in FIG. 3B. Those diodes in the "0" state will have a change in current level $I_1 - I_t$ whereas those diodes in the latter, however, including a spike from the diode travers- "1" state will have a change in current level $I_t - I_2$, the ing the valley of the curve 43 (see FIG. 2) to the operating point $I_t$. The change in the current level, when the readout pulse 60 is applied, is received by the sense amplifier which has been turned on prior to the activation of the selected driver. This change in current level, however, is a noise or disturb signal and not the "true" signal indicative of the information state of the diode. The true signals are no change in current for a binary "0" and a change of $\Delta I (I_1 - I_2)$ for a binary "1." Thus the signal defined as noise or disturb and the true signal must be distinguished by the sense amplifier from the "true" signal alone. Normally the noise or disturb is cancelled by feedback technique or the signal-to-disturb ratio is improved by the techniques disclosed in the above-mentioned Digest of Technical Papers. Neither method, however, is satisfactory for commercial information handling apparatus from a cost, simplicity and performance standpoint. Also, it will be apparent that any failure by the sense amplifier to distinguish between the "true" and disturb signal will introduce erroneous signals into the data processed by the information handling system, thereby causing faulty operation of the apparatus.

The present invention has improved memory operation by providing an output signal for the "0" condition but no output signal for the "1" storage condition of a storage element. Alternatively, the disturb signal is read as the "0" signal and advantageously cancelled to provide no output signal for the "1" signal. This method of operation, hereinafter designated the "read zero" method, eliminates the necessity for the sense amplifier to distinguish between the disturb and true signal since the disturb signal only is the one recognized by the sense amplifier. Although the disturb signal has been arbitrarily indicated as a binary "0" signal it may also be designated as a binary "1" signal.

Figure 4A:
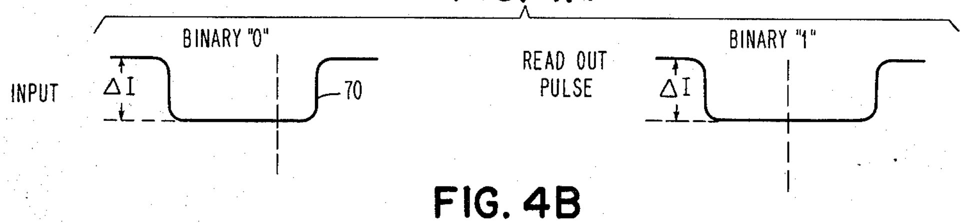
FIGS. 4A and 4B are input and output signals, respectively, to and from the memory shown in FIG. 1 employing the principles of the present invention.
Figure 4B:
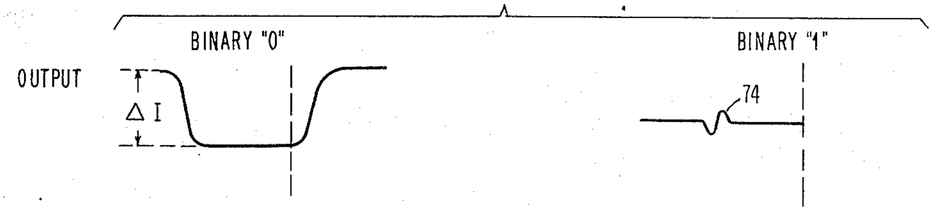

Turning to FIGURES 4A and 4B, one method of "read zero" operation is by controlling the magnitude of the read pulse 70. Selecting the magnitude of a read pulse applied by the word driver to be equal to the difference between $I_1$ and $I_2$ (see FIG. 2) causes the load line 47 to be lowered to a point that a revised load line 47' intersects the tunnel diode characteristic curve at an operating point A' which has the same current requirements as the binary "1" storage condition. Thus the binary "0" output signal will be of a magnitude equal to $I_1 - I_2$, the current difference between the operating points A and A' whereas no output signal will be provided for the binary "1" storage condition since the current level at A' is the same as that for the B operating point representative of the binary "1" storage condition. Such a method, as will be apparent to one skilled in the art, provides a disturb signal as the "0" signal and employs the "true" signal for the "1" condition to cancel the disturb signal, thereby providing no output signal for the "1" signal. Experience has further indicated that the output signals can be improved if the rise time of the driver pulse is an order of magnitude faster than the time width of the pulse (typically a 4 nanosecond rise time and a 20 nanosecond pulse width). Also, the bias point for the "1" condition should be as near to the valley of the curve 43 as the tolerance of the diode permits. And, the diode switching time should be relatively fast as compared to the pulse time.

In connection with the "1" signal, it should be noted that a ripple 74 appears therein for reasons previously indicated. The ripple in the signal is so slight in amplitude and short in duration that it may be easily filtered out by the inductance and capacitance of the sense amplifier. Thus, the "read zero" method of operating the memory provides a signal for the binary "0" storage condition, but no signal for the binary "1" condition. The difference between the two output signals is so distinguishable that a sense amplifier can clearly indicate the presence or absence of one or the other storage conditions. Now compensation or costly circuitry is no longer required to enhance the true signal with respect to the disturb signal. Further, no requirement is necessary as in prior art operation to distinguish between the true and the disturb signals, thereby eliminating the entry of erroneous data into the information being processed by the information handling apparatus.

Another alternative for providing the signals indicated above is to employ a suitable network 80, typically a filter in conjunction with the sense amplifier when driver signals of the type described above cannot be provided. The network should be designed in accordance with well-understood electrical engineering principles to integrate the voltage-time or current-time interval of the disturb and true signals. These intervals have been found to be substantially equal to each other when driver signals approximate the preferred driver signal previously described. Accordingly, output from the network to the sense amplifier will be zero as in the case when preferred driver signals are supplied to the memory. Thus, the addition of the network enables driver signals of nearly any shape to be employed in the present invention without affecting the performance of the memory.

Hence, the present invention provides improved operation of semiconductor memories in that clear and distinguishable signals are provided by such memories without any need for costly or complicated apparatus for compensating output signals as a result of driver noise appearing in the memory. Also, no requirement is necessary for the sense amplifier to distinguish between true and disturb signals, thereby simplifying the operation of the memory. Since the memory output signals are clearly distinguishable from each other and the sense amplifier is only required to recognize as between the presence of a signal and no signal, the present invention has been found to be especially suitable for commercial information handling apparatus.

While the invention has been particularly shown and described with reference to preferred methods, it will be understood by those skilled in the art that various changes in form and detail may be made therein without departing from the spirit and scope of this invention.

What is claimed is:

1. In combination
an active element having two regions in its operating range which exhibit a positive resistance and a region between them which exhibits a negative resistance, one positive resistance region being indicative of a first information state, the second positive resistance region being indicative of a second information state,
means providing a driving signal,
means, responsive to a driving signal, generating a disturb signal in the device, when the device is in the first information state and substantially nullifying the disturb signal when the device is in the second information state, and
amplifier means sensing the device while the driving signal is present.

2. In combination
a tunnel diode which is capable of assuming one of two stable information states, one at a high current, low voltage level, the other at lesser current and higher voltage level,
means, connected to the device, providing a driving signal of preselected magnitude,
said device responsive to the driving signal generating a disturb signal as an output when in one stable state and substantially nullifying the disturb as an output when the device is in the second stable state, and
amplifier means utilizing the disturb signal as one information state indication and the substantially nullifying disturb signal as the other information state indication.

3. In combination
a negative resistance diode which is capable of assuming one of two stable states, one at a relatively high current level and relatively low voltage level, and the other at a relatively low current level and relatively high voltage level,
means, connected to the device, providing a current signal having a preselected magnitude, the magnitude of the driving signal being equal to the difference between the current levels for the table states,
means, responsive to the driving signal, generating a disturb signal in the device when the device is in one stable state and substantially nullifying the disturb signal when the device is in the other stable state, and
amplifier means, directly connected to the diode, and sensing the device while the driving signal is present.

4. An electronic memory comprising an $m$ number of $x$ lines and an $n$ number of $y$ lines connected together to form an $mn$ number of crosspoints where $m$ and $n$ are any integer,
a bistable semiconductor device connected to each crosspoint as a storage element,
each storage element capable of assuming one of two stable states,
means, connected to each device, providing one or more driving signals,
means, responsive to the driving signal, generating a disturb signal in the device when the device is in one stable state, and substantially nullifying the disturb signal when the device is in the other stable state, and
amplifier means sensing the device while the driving signal is present.

5. The memory defined in claim 4 wherein the driving signal has a rise time of an order of magnitude less than the time width of the driving signals.

6. An electronic memory comprising
an $m$ number of $x$ lines and an $n$ number of $y$ lines connected together to form an $mn$ number of crosspoints where $m$ and $n$ are any integer,
a bistable semiconductor device connected to each crosspoint as a storage element,
means for biasing the storage element to operate in one of two stable states,
means providing driving signals to the storage elements,
means generating a disturb signal as an output signal when the device is in the first stable state and substantially nullifying the disturb signal as an output signal when the device is in the second stable state,
means for integrating the current-time interval of the disturb signal and the substantially nullified disturb signals as output signals from the storage element, and
a sense amplifier for receiving output signals from the integrating means.

References Cited by the Examiner

UNITED STATES PATENTS

| | | | |
|---|---|---|---|
| 2,877,359 | 3/59 | Ross | 340—173 |
| 2,986,724 | 5/61 | Jaeger | 340—173 |
| 3,017,613 | 1/62 | Miller | 340—173 |

OTHER REFERENCES

Publication: "Digest of Technical Papers 1960 International Solid-State Circuits Conference," by Miller, published by Louis Winner, New York 36, N.Y., 1st ed., February 1960, pp. 52–53.

IBM Technical Disclosure Bulletin, vol. 3, No. 11, April 1961, pp. 41 and 42.

IRVING L. SRAGOW, *Primary Examiner.*